(12) United States Patent
Barry et al.

(10) Patent No.: US 11,692,350 B2
(45) Date of Patent: Jul. 4, 2023

(54) COMPOSITE NOISE-ATTENUATING PANEL SYSTEM

(71) Applicant: Solar Turbines Incorporated, San Diego, CA (US)

(72) Inventors: Tyler B. Barry, Houston, TX (US); Marcel Van Der Stok, The Woodlands, TX (US); Francisco J. Torres, Fulshear, TX (US); Bernardo T. Perez, Houston, TX (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/364,134

(22) Filed: Jun. 30, 2021

(65) Prior Publication Data

US 2023/0003021 A1    Jan. 5, 2023

(51) Int. Cl.
| | |
|---|---|
| *E04B 2/00* | (2006.01) |
| *E04C 2/292* | (2006.01) |
| *E04B 1/86* | (2006.01) |
| *B32B 5/18* | (2006.01) |
| *B32B 3/06* | (2006.01) |
| *B32B 19/00* | (2006.01) |
| *B32B 15/04* | (2006.01) |
| *B32B 3/08* | (2006.01) |
| *E04C 2/00* | (2006.01) |

(52) U.S. Cl.
CPC ............... *E04C 2/292* (2013.01); *B32B 3/06* (2013.01); *B32B 3/08* (2013.01); *B32B 5/18* (2013.01); *B32B 15/046* (2013.01); *B32B 19/00* (2013.01); *E04B 1/86* (2013.01); *E04C 2/44* (2013.01); *B32B 2266/08* (2013.01); *B32B 2307/102* (2013.01); *E04C 2002/004* (2013.01)

(58) Field of Classification Search
CPC ................................ B32B 19/00; E04C 2/292
See application file for complete search history.

(56) References Cited

U.S. PATENT DOCUMENTS

| | | | |
|---|---|---|---|
| 3,447,275 A | 6/1969 | Vaughan et al. | |
| 3,573,145 A | 3/1971 | Witkosky et al. | |
| 3,611,653 A * | 10/1971 | Zinn | E04B 2/7412 |
| | | | 52/407.3 |

(Continued)

FOREIGN PATENT DOCUMENTS

| | | |
|---|---|---|
| CN | 103469985 A | 12/2013 |
| KR | 101373627 B1 | 3/2014 |
| WO | 00/75443 A1 | 12/2000 |

*Primary Examiner* — Basil S Katcheves
(74) *Attorney, Agent, or Firm* — Procopio, Cory, Hargreaves & Savitch LLP

(57) ABSTRACT

Enclosures are used to attenuate noise produced by a high decibel producing device, such as a gas turbine engine or other rotating machinery. However, enclosures that achieve high Sound Transmission Class (STC) ratings are generally expensive and immobile, whereas inexpensive and mobile enclosures are generally incapable of achieving high STC ratings. Accordingly, a composite noise-attenuating panel system is disclosed that can achieve the high STC ratings associated with immobile, site-erected enclosures, using subpanels that are separated by an air gap and an internal filler (e.g., mineral wool), while maintaining the weight, form factor, and ease of use associated with lightweight, modular mobile enclosures.

17 Claims, 7 Drawing Sheets

(56) References Cited

U.S. PATENT DOCUMENTS

| | | | |
|---|---|---|---|
| 4,487,291 A | 12/1984 | Walker | |
| 4,702,046 A * | 10/1987 | Haugen | E04B 1/86 52/144 |
| 5,416,285 A * | 5/1995 | Niehaus | E06B 5/20 181/290 |
| 6,196,352 B1 | 3/2001 | Goodchild | |
| 6,244,378 B1 | 6/2001 | McGrath | |
| 6,519,899 B1 * | 2/2003 | Hurzeler | H05K 9/0001 49/504 |
| 6,789,645 B1 * | 9/2004 | Deblander | E04B 1/86 181/290 |
| 7,168,216 B2 * | 1/2007 | Hagen, Jr. | B29C 44/186 52/404.3 |
| 7,343,715 B2 | 3/2008 | Ito et al. | |
| 7,934,352 B1 * | 5/2011 | Mollinger | E04F 17/00 52/545 |
| 8,074,766 B1 * | 12/2011 | Shore | E04B 1/86 181/290 |
| 8,181,738 B2 | 5/2012 | Tinianov et al. | |
| 8,240,103 B2 * | 8/2012 | Riepe | E04B 1/4178 52/309.4 |
| 8,495,851 B2 | 7/2013 | Surace et al. | |
| 8,820,476 B2 * | 9/2014 | Nam | E04B 2/7409 181/290 |
| 9,481,995 B2 * | 11/2016 | Bemis | E04C 2/205 |
| 9,702,152 B2 * | 7/2017 | Sievers | E04F 13/0869 |
| 10,294,668 B2 * | 5/2019 | Kreizinger | B32B 21/08 |
| 10,494,813 B2 * | 12/2019 | Costanza | E04B 1/14 |
| 10,683,661 B2 * | 6/2020 | Bigelow | E04F 21/1805 |
| 2006/0000670 A1 | 1/2006 | Dodd | |
| 2011/0122478 A1 * | 5/2011 | Lee | B32B 19/00 359/288 |
| 2011/0296794 A1 * | 12/2011 | Thomas | E04B 1/84 428/114 |
| 2012/0151869 A1 * | 6/2012 | Miller | E04B 1/7666 52/655.1 |
| 2012/0174511 A1 * | 7/2012 | Harding | E04F 21/18 294/93 |
| 2013/0209782 A1 * | 8/2013 | Kipp | C04B 28/26 156/39 |
| 2014/0115988 A1 * | 5/2014 | Sievers | E04F 13/007 52/302.1 |
| 2015/0376898 A1 * | 12/2015 | Kreizinger | E04C 2/284 52/483.1 |
| 2017/0253197 A1 * | 9/2017 | Murasawa | B60R 13/083 |
| 2019/0242127 A1 * | 8/2019 | Kreizinger | E04B 2/707 |

* cited by examiner

COMPOSITE NOISE-ATTENUATING PANEL SYSTEM

TECHNICAL FIELD

The embodiments described herein are generally directed to enclosures, and, more particularly, to a system of composite noise-attenuating panels.

BACKGROUND

The installation of high decibel (dB) producing devices, such as rotating machinery (e.g., a gas turbine engine or other turbomachinery), into new or existing production facilities, must usually satisfy stringent regional environment requirements. Typical solutions for reducing decibel transmission through production facility walls utilize site-erected walls and associated noise-attenuating features (e.g., the addition of extensive and heavy materials) to achieve the required Sound Transmission Class (STC) rating. However, the erection of walls requires significant effort and the resulting walls lack mobility.

Alternatively, lightweight industrial-quality-type wall panels are available that can be pre-installed onto a prefabricated modular building structure, which is then transported to the site. For example, International Patent Pub. No. WO 00/75443 by Deblander utilizes two core layers of noise-insulation foam (e.g., polyurethane foam), with an air gap therebetween. These core layers are sandwiched between two thin metal sheets to form a single metal-skinned panel. However, such panels do not achieve the high STC ratings required for many noise-sensitive industrial installations.

The present disclosure is directed toward overcoming one or more of the problems discovered by the inventors.

SUMMARY

In an embodiment, a composite noise-attenuating panel is disclosed that comprises: a first subpanel; a second subpanel; a plurality of spacer blocks positioned between the first subpanel and the second subpanel to define one or more spaces between the first subpanel and the second subpanel; and, in each of the one or more spaces, a first internal filler, wherein a width of the first internal filler is less than a width of the space from the first subpanel to the second subpanel, such that a portion of the space remains as an air gap at a position between the first subpanel and the second subpanel.

In an embodiment, a composite noise-attenuating panel system is disclosed that comprises a plurality of panels, wherein each of the plurality of panels includes a first subpanel, a second subpanel, a plurality of spacer blocks positioned between the first subpanel and the second subpanel to define one or more spaces between the first subpanel and the second subpanel, and, in each of the one or more spaces, a first internal filler, wherein a width of the first internal filler is less than a width of the space from the first subpanel to the second subpanel, such that a portion of the space remains as an air gap at a position between the first subpanel and the second subpanel, and wherein each of the first subpanel and the second subpanel of each of the plurality of panels includes an outer layer, an inner layer, and a second internal filler between the outer layer and the inner layer.

In an embodiment, a modular enclosure for a gas turbine engine is disclosed, wherein the modular enclosure comprises a plurality of panels, wherein each of the plurality of panels includes a first subpanel, a second subpanel, a plurality of closed-cell foam spacer blocks positioned between the first subpanel and the second subpanel to define one or more spaces between the first subpanel and the second subpanel, and, in each of the one or more spaces, mineral wool, wherein a width of the mineral wool is less than a width of the space from the first subpanel to the second subpanel, such that a portion of the space remains as an air gap at a position between the first subpanel and the second subpanel, and wherein each of the first subpanel and the second subpanel of each of the plurality of panels includes an outer layer, an inner layer, and mineral wool between the outer layer and the inner layer.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
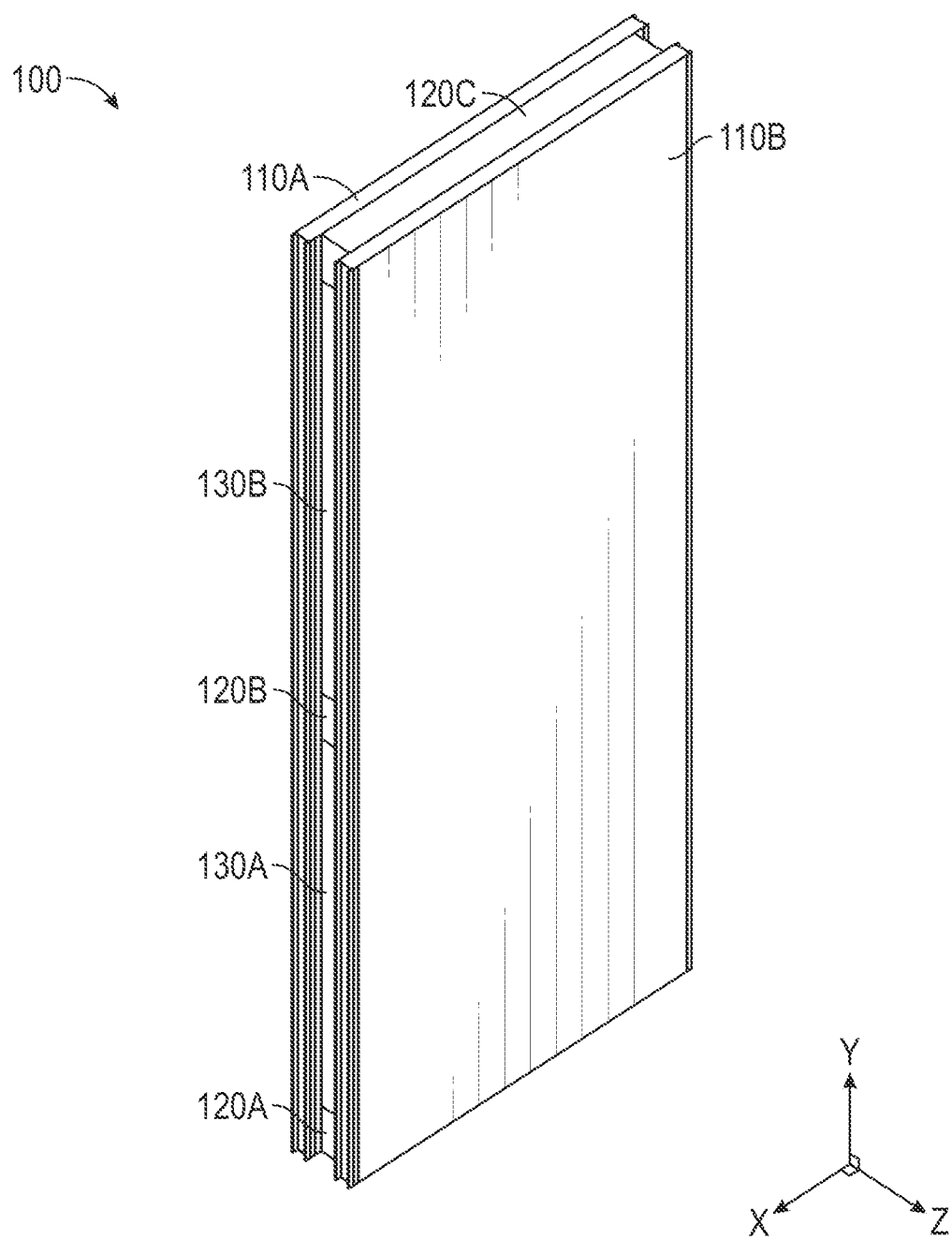
FIG. 1 illustrates an isometric view of a composite noise-attenuating panel, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

It should be understood that the various components illustrated herein are not necessarily drawn to scale. In other words, the features disclosed in various embodiments may be implemented using different relative dimensions within and between components than those illustrated in the drawings. Also, it should be understood that, as used herein, the terms "side," "top," "bottom," "front," "rear," "above," "below," "vertical," "horizontal," "width," "height," and the like are used for convenience of understanding, to convey the relative positions and dimensions of various components with respect to each other in the drawings and/or in typical applications, and do not imply any specific orientation of those components in absolute terms (e.g., with respect to the external environment or the ground).

FIG. 1 illustrates an isometric view of a composite noise-attenuating panel 100, according to an embodiment. For ease of understanding, X, Y, and Z axes are illustrated, but should not be understood to require any particular orientation of panel 100 in absolute terms. Each of the X, Y, and Z axes are orthogonal to each other. For the sake of consistency, as used herein, unless otherwise specified, the term "length" refers to a distance along the X axis, the term "height" refers to a distance along the Y axis, and the term "width" refers to a distance along the Z axis.

In an embodiment, panel 100 comprises two subpanels 110, including a first subpanel 110A and a second subpanel 110B. One or more spacer blocks 120 are sandwiched between first subpanel 110A and second subpanel 110B along the Z axis. In the illustrated embodiment, a plurality of spacer blocks 120 are sandwiched between first subpanel 110A and second subpanel 110B. Specifically, a first spacer block 120A is sandwiched between first subpanel 110A and second subpanel 110B at a first end of panel 100, a second spacer block 120B is sandwiched between first subpanel 110A and second subpanel 110B in the middle of panel 100, and a third spacer block 120C is sandwiched between first subpanel 110A and second subpanel 110B at the second end of panel 100, opposite the first end. In alternative embodiments, more or fewer spacer blocks 120 may be sandwiched between first subpanel 110A and second subpanel 110B, and/or in a different arrangement than illustrated, based on the particular design goals for panel 100. For example, the number of spacer blocks 120 may be two, three, four, five, and so on. In a particular implementation, the number of spacer blocks 120 is at least three. In general, increasing the number or area of spacer blocks 120 may improve the structural integrity of panel 100, but may diminish the noise-attenuating characteristics of panel 100.

In the illustrated embodiment, spacer blocks 120 are spaced apart along the Y axis to define one or more spaces between first subpanel 110A and second subpanel 110B. For example, a first space is defined by first subpanel 110A, second subpanel 110B, spacer block 120A, and spacer block 120B, and a second space is defined by first subpanel 110A, second subpanel 110B, spacer block 120B, and spacer block 120C. Each spacer block 120 may extend an entire length of panel 100 along the X axis. It should be understood that, as used herein, the term "an entire length" may include both an instance in which spacer block 120 spans all of the entire length of panel 100 and an instance in which spacer block 120 spans virtually the entire length of panel 100, except for a small length (e.g., 0-3 inches) on one or both ends, along the X axis, to avoid interference with panel fastening mechanisms described elsewhere herein (e.g., fastening mechanisms 510 and 520). In an alternative embodiment, each spacer block 120 may extend only a partial length of panel 100 along the X axis, and/or spacer blocks 120 may be spaced apart along both the X and Y axes (e.g., in a grid pattern). Each spacer block 120 may have a rectangular cross-section along all three X, Y, and Z axes. In an alternative embodiment, each spacer block 120 may have different cross-sectional shapes along one or more of the X, Y, and Z axes.

Each space between first subpanel 110A and second subpanel 110B may be partially filled by an internal filler 130. For example, in the illustrated embodiment, the first space, which is defined by first subpanel 110A, second subpanel 110B, spacer block 120A, and spacer block 120B, is partially filled by internal filler 130A. Similarly, the second space, which is defined by first subpanel 110A, second subpanel 110B, spacer block 120B, and spacer block 120C, is partially filled by internal filler 130B. Each internal filler 130 may fill the respective space along both the X and Y axes, but only partially fill the respective space along the Z axis. In this case, a portion of the respective space will remain as an air gap between first subpanel 110A and second subpanel 110B.

Figure 2:
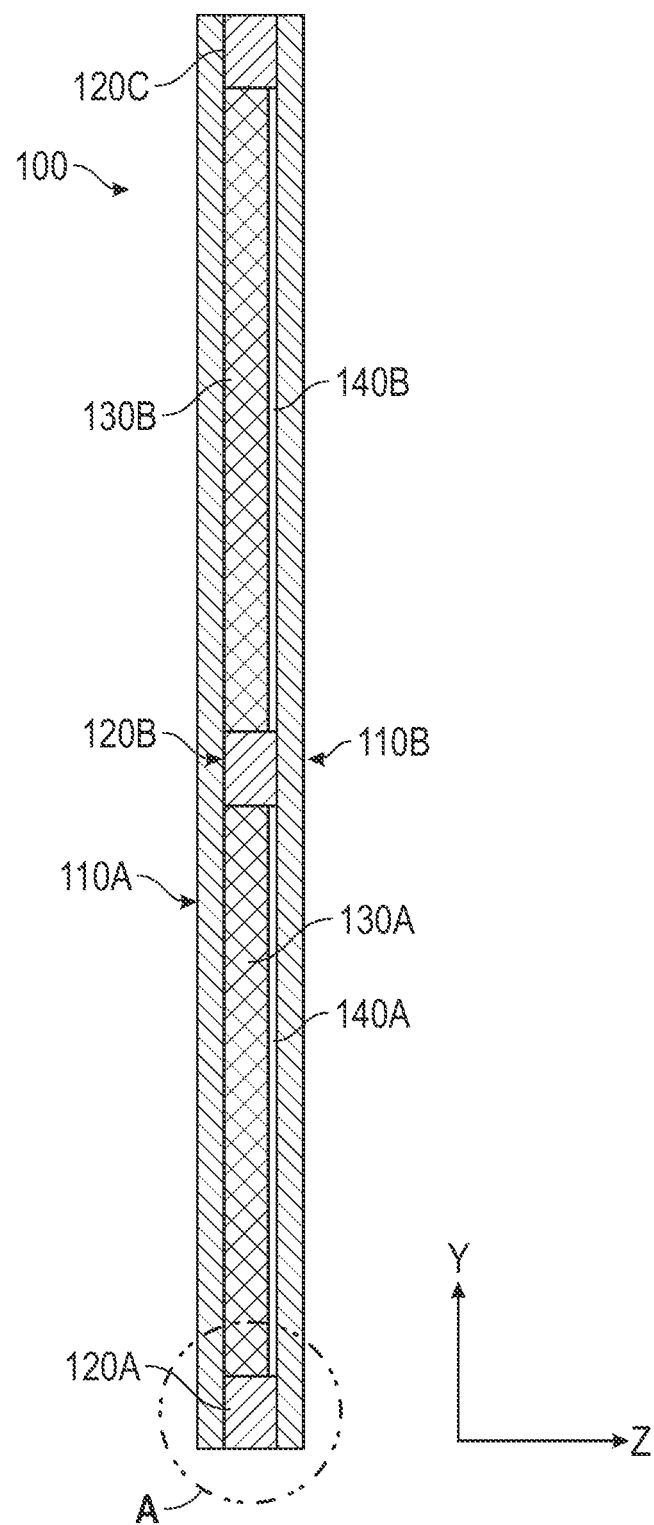
FIG. 2 illustrates a cross-sectional view of a composite noise-attenuating panel, according to an embodiment.
Figure 3:
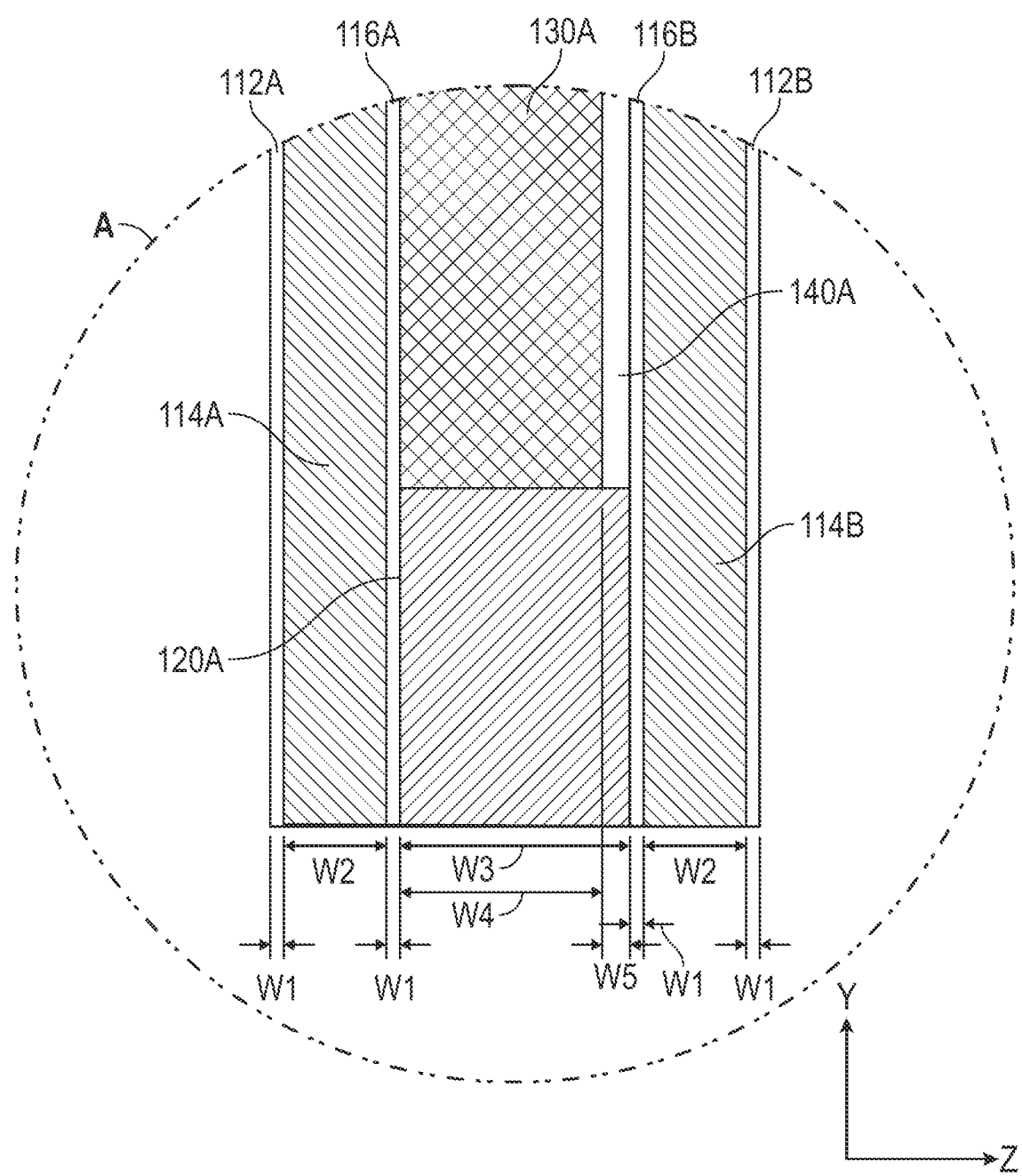
FIG. 3 illustrates a portion of a cross-sectional view of a composite noise-attenuating panel, according to an embodiment.

FIG. 2 illustrates a cross-sectional view of a composite noise-attenuating panel 100, cut in the Y-Z plane, and FIG. 3 illustrates a close-up view of the portion of the cross-sectional view in circle A in FIG. 2, according to an embodiment. As illustrated, each subpanel 110 may comprise an outer layer 112, an inner layer 116, and an internal filler 114 that is sandwiched between outer layer 112 and inner layer 116. For example, first subpanel 110A comprises outer layer 112A, inner layer 116A, and internal filler 114A sandwiched between outer layer 112A and inner layer 116A. Similarly, second subpanel 110B comprises outer layer 112B, inner layer 116B, and internal filler 114B sandwiched between outer layer 112B and inner layer 116B.

To form each subpanel 110, the outer layer 112 and inner layer 116 of the subpanel 110 may each be fixed to internal filler 114 via any fastening means, including, without limitation, adhesive (e.g., cement adhesive). For example, internal filler 114 may be adhered on one side, along the Z axis, to the internal surface of outer layer 112 and on the opposite side, along the Z axis, to the internal surface of inner layer 116. In this case, outer layer 112 is fixed to inner layer 116, indirectly, via their mutual adhesion to internal filler 114. Additionally or alternatively, outer layer 112 may be joined directly to inner layer 116, for example, at their outer edges, via fastening means (e.g., adhesive, nuts and bolts, screws, etc.), and/or the like.

In an embodiment, the widths of each outer layer 112 and each inner layer 116 are substantially identical (i.e., W1). In an alternative embodiment, the width of outer layer 112 may be different from the width of inner layer 116, the width of outer layer 112A may be different from the width of outer layer 112B, and/or the width of inner layer 116A may be different from the width of inner layer 116B.

In an embodiment, each outer layer 112 and each inner layer 116 comprises or consists of the same material. For example, outer layers 112A and 112B and inner layers 116A and 116B may all comprise or consist of sheet metal. The sheet metal may be 26 to 24 gauge (e.g., W1 is 0.01875 to 0.025 inches). In an alternative embodiment, outer layer 112 may comprise or consist of different material than inner layer 116, outer layer 112A may comprise or consist of different material than outer layer 112B, and/or inner layer 116A may comprise or consist of different material than inner layer 116B.

In an embodiment, the widths of internal filler 114A and internal filler 114B are substantially identical (i.e., W2). In an alternative embodiment, the width of internal filler 114A may be different from the width of internal filler 114B.

In an embodiment, all internal fillers 114 comprise or consist of the same material. For example, internal filler 114A and internal filler 114B may both comprise or consist of mineral wool. The mineral wool may have a density of 8.0-8.5 pounds per cubic foot ($lb/ft^3$). In an alternative embodiment, internal filler 114A may comprise or consist of different material than internal filler 114B or may comprise or consist of the same material but with a different density.

In an embodiment, internal filler may comprise a plurality of sheets of material (e.g., mineral wool). For example, the material may be formed into thin, slender sheets, that are stacked as layers between outer layer 112 and inner layer 116. Within each layer, the sheets may be staggered. Additionally or alternatively, adjacent layers may be rotated (e.g., 90 degrees) with respect to each other, such that they crisscross when viewed down the Z axis. Each layer may be adhered to its adjacent layers, and the two outermost layers, along the Z axis, may be adhered to outer layer 112 and inner layer 116, respectively.

Each spacer block 120 may have a width W3. Thus, spacer block(s) 120 define one or more spaces between first subpanel 110A and second subpanel 110B, with each space having a width W3. Spacer block(s) 120 may provide structural integrity to panel 100 by forming fixed points of contact between first subpanel 110A and second subpanel 110B, which prevent relative movement between first subpanel 110A and second subpanel 110B, as well as providing support against deformation of first subpanel 110A and second subpanel 110B.

Each spacer block 120 may be joined to first subpanel 110A and second subpanel 110B via any fastening means, including, without limitation, adhesive (e.g., cement adhesive). For example, spacer block 120 may be adhered on one side, along the Z axis, to the outer surface of inner layer 116A of first subpanel 110A. Spacer block 120 could also be adhered on the opposite side, along the Z axis, to the outer surface of inner layer 116B of second subpanel 110B. In this case, first subpanel 110A is fixed to second subpanel 110B, indirectly, via their mutual adhesion to spacer block(s) 120. Additionally or alternatively, first subpanel 110A may be joined directly to second subpanel 110B via fastening means, such as nuts and bolts, screws, and/or the like. For example, in an embodiment, spacer block 120 is adhered on one side, along the Z axis, to the outer surface of inner layer 116A of first subpanel 110A, and is fastened to second subpanel 110B via fastening means described elsewhere herein (e.g., fastener 420) that fastens second subpanel 110B to first subpanel 110A with spacer block 120 compressed therebetween. In this case, spacer block 120 does not need to be adhered to second subpanel 110B.

In an embodiment, all spacer blocks 120 comprise or consist of the same material. For example, each spacer block 120 may comprise or consist of closed-cell foam. Closed-cell foam has minimal compression, thereby providing structural integrity, but with sufficient flexibility to minimize the transmission of vibrations, between first subpanel 110A and second subpanel 110B, through spacer block 120. The closed-cell foam may have a density of 2.5-5.0 pounds per cubic foot (40 to 80 kilograms per cubic meter) and/or a compression deflection of 2-5 pounds per square inch (14 to 34 kilopascals). Alternatively, in an embodiment with a plurality of spacer blocks 120, one spacer block 120 may comprise or consist of different material than another spacer block 120.

In an embodiment, one or more blocks or sheets of internal filler 130 are provided in the space between first subpanel 110A and second subpanel 110B, formed by spacer block(s) 120. For example, a first block of internal filler 130A may be provided in the space between spacer blocks 120A and 120B, and a second block of internal filler 130B may be provided in the space between spacer blocks 120B and 120C.

Each block of internal filler 130 may have a width W4 that is less than the width W3 of spacer block(s) 120, and may be provided on only one of subpanels 110. For example, in the illustrated embodiment, internal filler 130 is provided on only first subpanel 110A, thereby forming an air gap 140 of width W5 (i.e., equal to the difference between W3 and W4) between internal filler 130 and second subpanel 110B. In an alternative embodiment, internal filler 130 may be provided only on second subpanel 110A, thereby forming air gap 140 between internal filler 130 and first subpanel 110A. In yet another alternative embodiment, internal filler 130 could be provided on both first subpanel 110A and second subpanel 110B, with each internal filler 130 having a width of half of W4, such that air gap 140 is formed between the internal fillers 130 on opposing subpanels 110. In an embodiment, the ratio of W4 to W5 may be in the range of two to five. In a preferred embodiment, the ratio of W4 to W5 may be substantially four, such that the width W4 of internal filler 130 is approximately 80% of the width W3 of spacer block 120, and the width W5 of air gap 140 is approximately 20% of the width W3 of spacer block 120.

In any case, internal filler 130 may be joined to the outer surface of inner layer 116 of a subpanel 110 via any fastening means, including, without limitation, adhesive (e.g., cement adhesive). For example, internal filler 130 may be adhered on one side to the outer surface of inner layer 116A of first subpanel 110A, leaving air gap 140 on the opposite side of internal filler 130, between internal filler 130 and the outer surface of inner layer 116B of second subpanel 110B.

In an embodiment, all blocks of internal filler 130 comprise or consist of the same material. For example, internal filler 130A and internal filler 130B may both comprise or consist of mineral wool. In addition, in an embodiment, internal filler 130 comprises or consists of the same material as internal filler 114. For example, both internal filler 130 and internal filler 114 may comprise or consist of mineral wool. The mineral wool may have a density of 8.0-8.5 pounds per cubic foot. In an alternative embodiment, internal filler 130A may comprise or consist of different material than internal filler 130B, and/or internal filler 130 may comprise or consist of different material than internal filler 114.

In an embodiment, the area of spacer block(s) 120 between first subpanel 110A and second subpanel 110B, in a cross-section cut in the X-Y plane, may be minimized, so as to provide the structural integrity desired for the particular application, while maximizing the area of internal filler 130 and air gap 140. The maximization of the area of internal filler 130 and air gap 140, in this manner, may help reduce the transmission of vibrations through panel 100, thereby increasing the noise attenuation of panel 100 and increasing the STC rating of panel 100.

To demonstrate an example scale of a panel 100, dimensions of a particular implementation of panel 100 will now be described. It should be understood that these dimensions are only provided as a non-limiting example, and that panel 100 may have different dimensions than those described. In a particular implementation, panel 100 may have a height along the Y axis of 13 feet with four spacer blocks 120 that each have a height along the Y axis of 5.5 inches. The first spacer block 120 may be positioned with its bottom surface substantially flush with the bottommost surface of panel 100, the second spacer block 120 may be positioned with a center line (i.e., parallel to the Z axis) that is 4.25 feet above the bottommost surface of panel 100, the third spacer block 120 may be positioned with a center line that is 8.25 feet above the bottommost surface of panel 100, and the fourth spacer block 120 may be positioned with its top surface substantially flush with the topmost surface of panel 100. The width of each subpanel 110 (i.e., W2+2*W1) may be 2 inches (e.g., with W1 between 0.01875 to 0.025 inches), the width W3 of spacer blocks 120 may be 4 inches, and the width W4 of internal filler 130 may be 3.5 inches, such that the width W5 of air gap 140 is 0.5 inches and the entire width of panel 100 is 8 inches. In an alternative implementation, the width of each subpanel 110 (i.e., W2+2*W1) may be 2 inches (e.g., with W1 between 0.01875 to 0.025 inches), the width W3 of spacer blocks 120 may be 2 inches, and the width W4 of internal filler 130 may be 1.5 inches, such that the width W5 of air gap 140 is 0.5 inches and the entire width of panel 100 is 6 inches.

Figure 4:
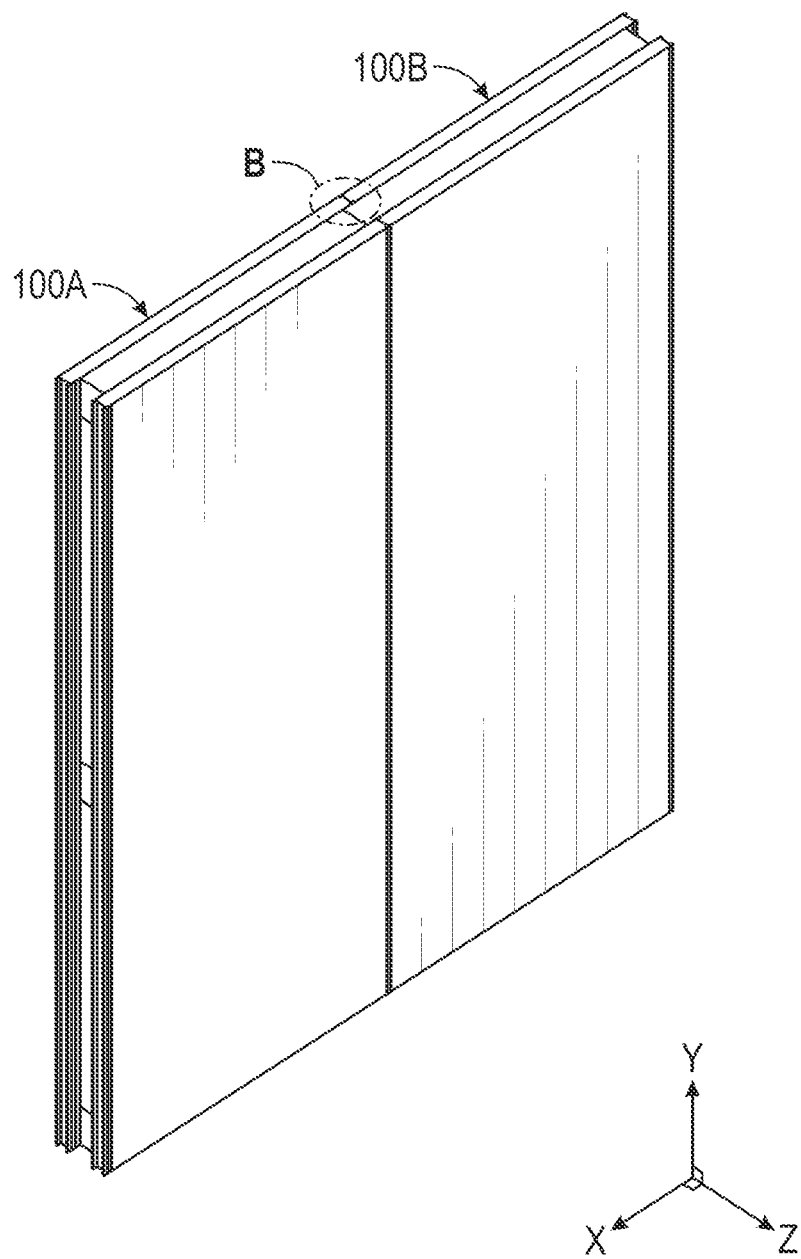
FIG. 4 illustrates an isometric view of two joined composite noise-attenuating panels, according to an embodiment.
Figure 5:
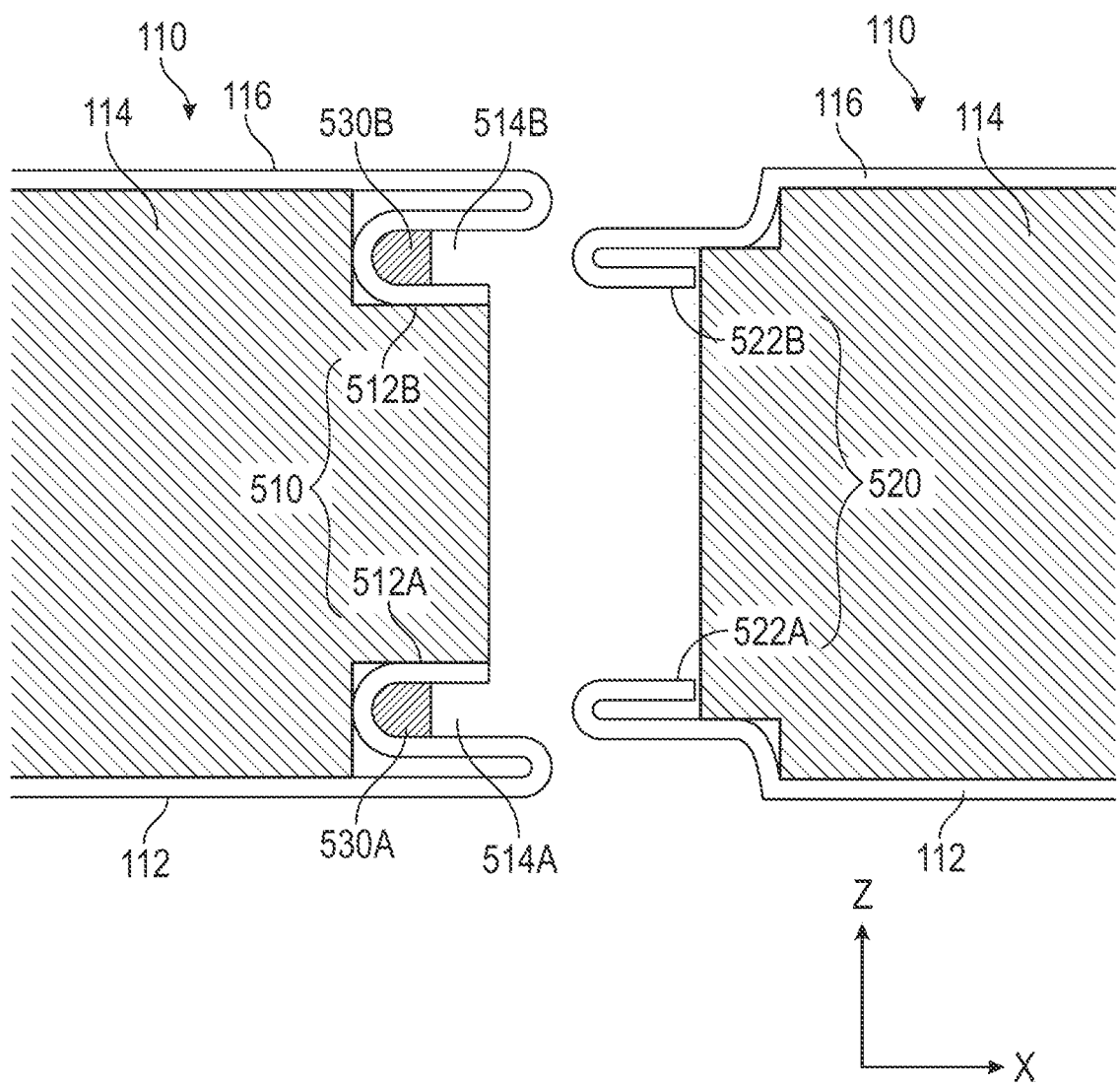
FIG. 5 illustrates a top-down, close-up portion of two un-joined subpanels, according to an embodiment.
Figure 6:
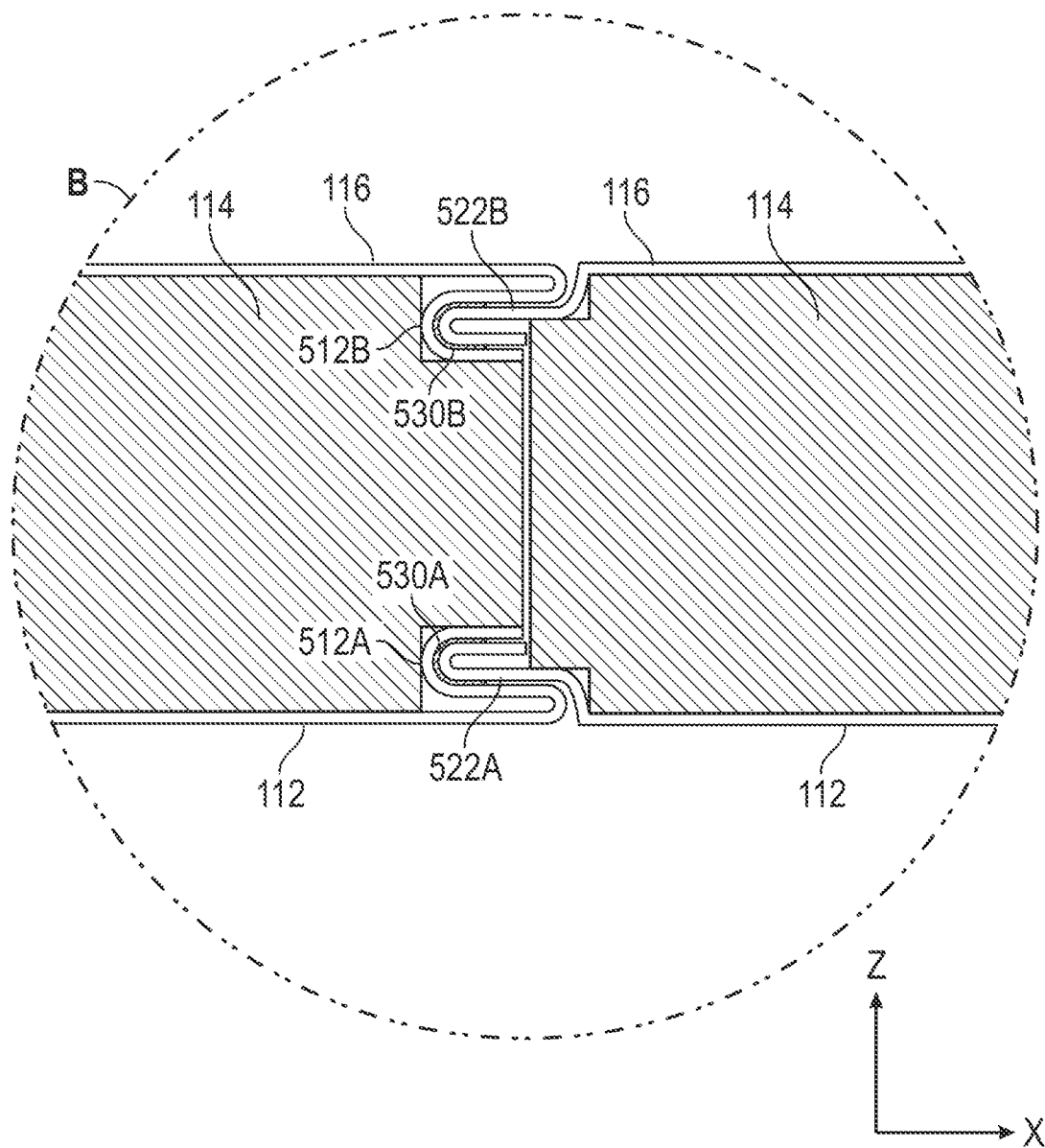
FIG. 6 illustrates a top-down, close-up portion of two joined subpanels, according to an embodiment.

FIG. 4 illustrates an isometric view of two joined composite noise-attenuating panels 100A and 100B, according to an embodiment. In addition, FIG. 5 illustrates a top-down, close-up portion of two un-joined subpanels 110 of panels 100A and 100B, and FIG. 6 illustrates a top-down, close-up view of circle B in FIG. 4. For ease of illustration, only a single subpanel 110 is shown for each of panels 100A and 100B in FIGS. 5 and 6. The other subpanel 110, spacer block(s) 120, internal filler 130, and air gap 140 are not shown. However, it should be understood that the other subpanel 110 of a panel 100 may be identical to the subpanel 110 illustrated in FIGS. 5 and 6.

Each subpanel 110 may comprise a first fastening mechanism 510 on a first end of subpanel 110, along the X axis, and a second fastening mechanism 520 on a second end of subpanel 110 that is opposite the first end along the X axis. First fastening mechanism 510 on the first end of each subpanel 110 of a panel 100A is configured to mate with second fastening mechanism 520 on the second end of a corresponding subpanel 110 of an adjacent panel 100B. Thus, each panel 100A may be joined to an adjacent panel 100B by mating the first fastening mechanism 510 of each subpanel 110 of panel 100A to the second fastening mechanism 520 of the corresponding subpanels 110 of adjacent panel 100B.

In an embodiment, first fastening mechanism 510 comprises a first female portion 512A formed in outer layer 112, and a second female portion 512B formed in inner layer 116. Each female portion 512 may be formed by bending the first end of respective layer 112 or 116 twice, such that the first end of the respective layer 112 or 116 is bent back towards the second end of subpanel 110, substantially parallel to the X axis, and is then bent away from the second end of subpanel 110, substantially parallel to the X axis. As illustrated, female portions 512A and 512B, bent in this manner, define recesses 514A and 514B, respectively. Alternatively, first fastening mechanism 510 may comprise a different female portion or a different fastening means altogether.

In an embodiment, second fastening mechanism 520 comprises a first male portion 522A formed in outer layer 112, and a second male portion 522B formed in inner layer 116. Each male portion 522 may be formed by bending the second end of respective layer 112 or 116 three times, such that the second end is bent laterally towards the interior of subpanel 110, substantially parallel to the z axis, bent away from the first end, substantially parallel to the X axis, and then bent back towards the first end, substantially parallel to the X axis. As illustrated, male portions 522A and 522B, bent in this manner, define protrusions. The protrusions may be configured in dimensions (e.g., length along the X axis and width along the Z axis) to be inserted into recesses 514A and 514B of corresponding female portions 512A and 512B, respectively, as illustrated in FIG. 6. Alternatively, second fastening mechanism 520 may comprise a different male portion or a different fastening means altogether, as long as second fastening mechanism 520 is capable of mating or engaging with first fastening mechanism 510.

In an embodiment, sealant 530 may be inserted into recesses 514, prior to inserting the protrusions of male portions 522 into recesses 514. In an alternative embodiment, sealant 530 may only be inserted into a single recess 514 of each subpanel 110 (e.g., sealant 530 may be inserted into recess 514A in outer layer 112, but not recess 514B in inner layer 116). Sealant 530 may comprise, for example, non-skinning butyl sealant. The non-skinning butyl sealant may be applied to the innermost portion of recesses 514 as a ⅜-inch continuous bead. Panel 100A may be joined to adjacent panel 100B by applying sealant 530 within recesses 514 on the first end of both first subpanel 110A and second subpanel 110B of panel 100A, and sliding panel 100A towards panel 100B, along the X axis, such that recesses 514 of female portions 512 engage and mate with the protrusions of male portions 522. Sealant 530 provides a seal between each female portion 510 and the male portion 520 to which it is mated, as illustrated in FIG. 6.

Figure 7:
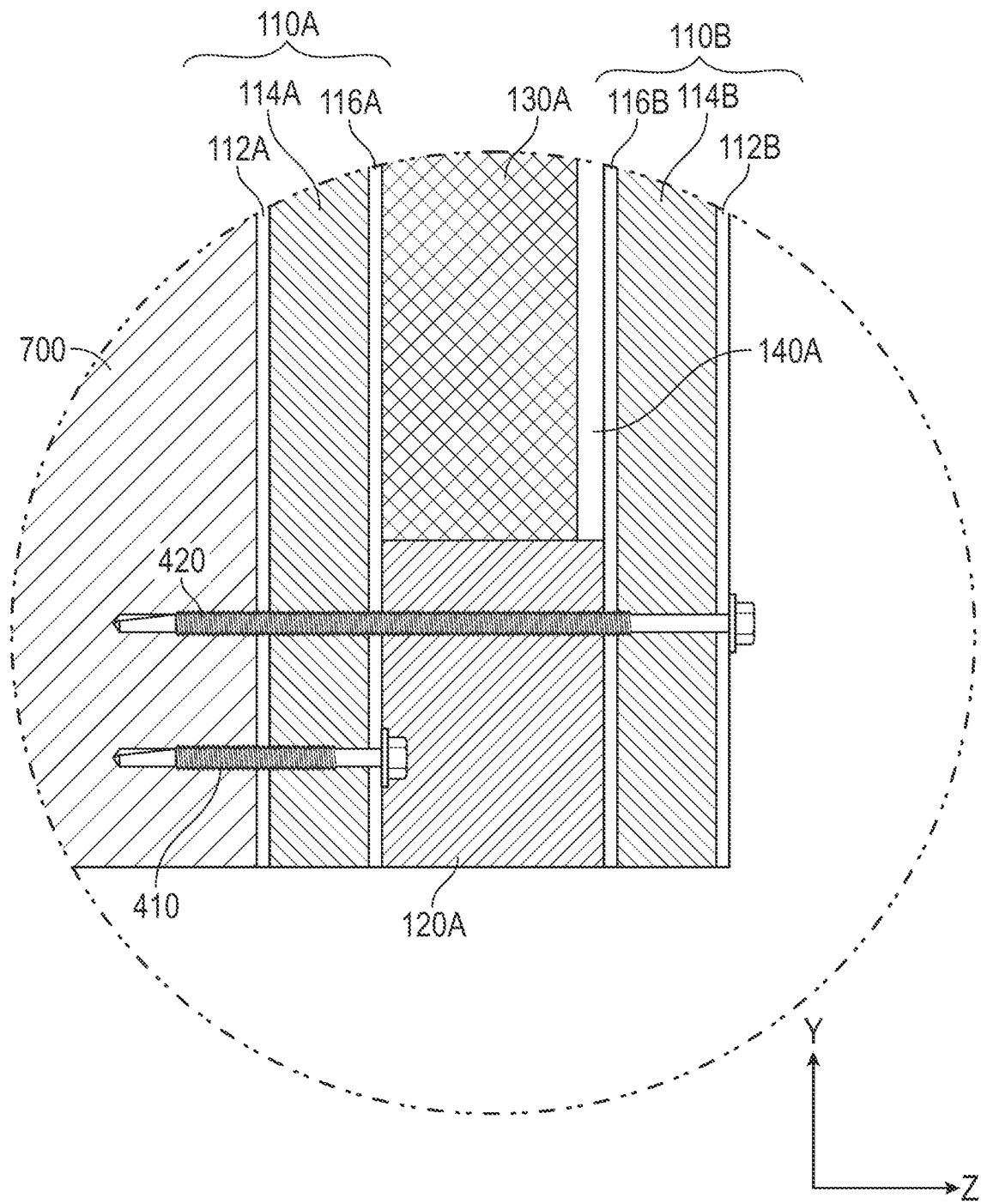
FIG. 7 illustrates an example of how a panel may be installed to a frame, according to an embodiment.

FIG. 7 illustrates an example of how a panel 100 may be installed to a frame 700, according to an embodiment. In particular, a plurality of first fasteners 410 may be installed through first subpanel 110A, which is the interior subpanel 110 in the illustrated example (i.e., the subpanel 110 adjacent to frame 700), into frame 700. In addition, a plurality of second fasteners 420 may be installed through both second subpanel 110B and first subpanel 110A into frame 700. In an alternative embodiment, first fasteners 410 may be omitted, such that only second fasteners 420 are used. Each fastener 410 and 420 may be a screw, comprising a screw head and a threaded shaft, such as a self-drilling, hex-head screw in combination with a neoprene washer. The number of fasteners 410 and 420 and the spacing between fasteners 410 and 420 may vary depending on the particular application. Frame 700 may be any structure around which panels 100 are to be installed, such as a wall, a post, and/or the like.

A panel 100 may be installed to frame 700 as a single unit. Alternatively, components of a panel 100 may be installed to frame 700 in steps. For example, first subpanel 110A may be fastened to frame 700 using fasteners 410. Then, spacer blocks 120 and internal filler 130 may be adhered to the outer surface of inner layer 116 of first subpanel 110A. Optionally, the outer surface of inner layer 116 of second subpanel 110B may be adhered to spacer blocks 120. Finally, second subpanel 110B may be fastened to frame 700, through spacer blocks 120 and first subpanel 110A, using fasteners 420. This manner of installation enables alignment during the assembly process.

INDUSTRIAL APPLICABILITY

Any number of panels 100 may be joined in the described manner to form a continuous paneled wall of two or more panels 100. Whether consisting of a single panel 100 or a plurality of panels 100, two or more paneled walls may be installed (e.g., component by component, panel by panel, or as joined panels) on a frame or otherwise assembled to form a partial or full noise-attenuating modular enclosure. It should be understood that the paneled walls may be used as side walls, top walls, and/or bottom walls of the modular enclosure.

The resulting modular enclosure can be installed on a frame 700 or otherwise assembled to enclose a high decibel producing devices, such as rotating machinery (e.g., gas turbine engine). Air gap 140, between subpanels 110A and 110B, acts as a vibration barrier that prevents or reduces vibrations passing between first subpanel 110A and second subpanel 110B. The combination of internal fillers 114, 130, and air gap 140 creates a tortuous sound path that attenuates noise escaping the enclosure. Thus, an enclosure of panels 100 acts a noise barrier capable of achieving a high STC rating. In addition, spacer blocks 120 provide structural integrity to the enclosure of panels 100 to protect against collapse, deformation, and other structural failures.

Such a modular enclosure provides flexible design applications for a variety of noise-level demands, and can deliver sound reduction performance with little to no field work, and with a smaller, lighter form factor and reduced timeline.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of device. Hence, although the present embodiments are, for convenience of explanation, depicted and described as being implemented to reduce noise of high decibel producing devices, such as rotating machinery, it will be appreciated that it can be implemented to attenuate noise from various other types of decibel producing devices, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A composite noise-attenuating panel comprising:
    a first subpanel comprising
        a first sheet metal outer layer,
        a first sheet metal inner layer, and
        a first subpanel internal filler between the first sheet metal outer layer and the first sheet metal inner layer;
    a second subpanel comprising
        a second sheet metal outer layer,
        a second sheet metal inner layer, and
        a second subpanel internal filler between the second sheet metal outer layer and the second sheet metal inner layer;
    a plurality of spacer blocks positioned between the first subpanel and the second subpanel to define one or more spaces between the first subpanel and the second subpanel; and
    in each of the one or more spaces, a first internal filler, wherein a width of the first internal filler is less than a width of the space from the first subpanel to the second subpanel, such that a portion of the space remains as an air gap at a position between the first subpanel and the second subpanel.

2. The composite noise-attenuating panel of claim 1, wherein the air gap is positioned between the first internal filler and the second subpanel.

3. The composite noise-attenuating panel of claim 2, wherein the first internal filler is adhered to an outer surface of the first subpanel.

4. The composite noise-attenuating panel of claim 1, wherein the first internal filler comprises mineral wool.

5. The composite noise-attenuating panel of claim 1, wherein each of the plurality of spacer blocks comprises closed-cell foam.

6. The composite noise-attenuating panel of claim 1, wherein each of the plurality of spacer blocks is adhered to an outer surface of the first subpanel.

7. The composite noise-attenuating panel of claim 1, wherein the sheet metal is 26 to 24 gauge.

8. The composite noise-attenuating panel of claim 1, wherein the first subpanel internal filler comprises mineral wool.

9. The composite noise-attenuating panel of claim 8, wherein the first internal filler comprises mineral wool.

10. The composite noise-attenuating panel of claim 1, wherein a first end of each of the first sheet metal outer layer and the first sheet metal inner layer is shaped into a recess, and wherein a second end of each of the first sheet metal outer layer and the first sheet metal inner layer, which is opposite the first end, is shaped into a protrusion that is configured to fit within the recess and
    a first end of each of the second sheet metal outer layer and the second sheet metal inner layer is shaped into a recess, and wherein a second end of each of the second sheet metal outer layer and the second sheet metal inner layer, which is opposite the first end, is shaped into a protrusion that is configured to fit within the recess.

11. The composite noise-attenuating panel of claim 1, wherein the plurality of spacer blocks comprises at least three spacer blocks that are spaced apart along a first axis to define two or more spaces.

12. The composite noise-attenuating panel of claim 11, wherein each of the plurality of spacer blocks extends an entire length of the panel along a second axis that is orthogonal to the first axis.

13. The composite noise-attenuating panel of claim 1, wherein a ratio of the width of the first internal filler to a width of the air gap from the first subpanel to the second subpanel is in a range of two to five.

14. A composite noise-attenuating panel system comprising a plurality of panels,
    wherein each of the plurality of panels includes
        a first subpanel,
        a second subpanel,
        a plurality of spacer blocks positioned between the first subpanel and the second subpanel to define one or more spaces between the first subpanel and the second subpanel, and,
        in each of the one or more spaces, a first internal mineral wool filler, wherein a width of the first internal mineral wool filler is less than a width of the space from the first subpanel to the second subpanel, such that a portion of the space remains as an air gap at a position between the first subpanel and the second subpanel, and
    wherein each of the first subpanel and the second subpanel of each of the plurality of panels includes
        an outer sheet metal layer,
        an inner sheet metal layer, and
        a second internal mineral wool filler between the outer layer and the inner layer.

15. The composite noise-attenuating panel system of claim 14, wherein a first end of each of the outer layer and the inner layer of each of the first and second subpanels of each of the plurality of panels is shaped into a recess, wherein a second end of each of the outer layer and the inner layer of each of the first and second subpanels of each of the plurality of panels is shaped into a protrusion that is configured to fit within the recess, and wherein the second end is opposite the first end.

16. The composite noise-attenuating panel system of claim 14, wherein each of the plurality of spacer blocks comprises closed-cell foam.

17. A modular enclosure for a gas turbine engine,
wherein the modular enclosure comprises a plurality of panels,
wherein each of the plurality of panels includes
   a first subpanel,
   a second subpanel,
   a plurality of closed-cell foam spacer blocks positioned between the first subpanel and the second subpanel to define one or more spaces between the first subpanel and the second subpanel, and,
   in each of the one or more spaces, mineral wool, wherein a width of the mineral wool is less than a width of the space from the first subpanel to the second subpanel, such that a portion of the space remains as an air gap at a position between the first subpanel and the second subpanel, and
wherein each of the first subpanel and the second subpanel of each of the plurality of panels includes
   an outer sheet metal layer,
   an inner sheet metal layer, and
   mineral wool between the outer layer and the inner layer.

* * * * *